United States Patent [19]

Sawhill

[11] Patent Number: 4,800,088
[45] Date of Patent: Jan. 24, 1989

[54] ANIMAL FEED SUPPLEMENT WITH FILLER AND METHOD OF PREPARING THE SAME

[75] Inventor: J. Wallace Sawhill, Canoga Park, Calif.

[73] Assignee: Pacific Kenyon Corp., Long Beach, Calif.

[21] Appl. No.: 37,593

[22] Filed: Apr. 13, 1987

[51] Int. Cl.$^4$ .......................... A23K 1/02; A23K 1/14; A23K 1/16; A23K 1/22
[52] U.S. Cl. ..................................... 426/69; 426/623; 426/630; 426/635
[58] Field of Search .................. 426/69, 623, 630, 635

[56] References Cited

U.S. PATENT DOCUMENTS

| | | | |
|---|---|---|---|
| 2,819,966 | 1/1958 | Colby | 426/69 |
| 4,160,041 | 7/1979 | Schroeder et al. | 426/69 |
| 4,171,386 | 10/1979 | Skoch et al. | 426/69 |
| 4,431,675 | 2/1984 | Schroeder et al. | 426/69 |
| 4,631,192 | 12/1986 | Mommer et al. | 426/69 |

Primary Examiner—Donald E. Czaja
Assistant Examiner—Helen Pratt
Attorney, Agent, or Firm—Plante, Strauss & Vanderburgh

[57] ABSTRACT

A method of making a free choice feed block solidified with calcium hydroxide, etc. which is improved by incorporating a 2 to 20% protein meal and 16–20% of a solid filler of brans, hulls and shells to produce a solid hardness of from 35–60. The presence of the protein meal and filler increases the hardness of the feed block.

34 Claims, No Drawings

ANIMAL FEED SUPPLEMENT WITH FILLER AND METHOD OF PREPARING THE SAME

BACKGROUND OF THE INVENTION

1. Field of Invention

This invention relates to an animal feed supplement and, in particular, to a solid animal feed supplement.

2. Brief Statement of the Prior Art

Molasses has been used for many years as an animal feed supplement together with additives such as phosphoric acid and feed nutrients such as urea, fats, and the like. Solid materials such as cottonseed meal have also been suspended in the molasses; however, difficulties have been experienced with maintaining a stable suspension of solid materials. The liquid supplements have been fed by application to fodder or by free choice feeding on lick-wheels.

Feed supplements have also been manufactured and marketed as solid blocks. The earliest blocks were pressed blocks which were formed by compressing mixtures of molasses and dry ingredients. Poured blocks, in which the ingredients are mixed with molasses and poured into containers where they solidify, are more recent developments. The earliest commercial poured block was prepared by evaporative heating of molasses similar to candy manufacturing as described in U.S. Pat. No. 3,961,081. All of the aforementioned blocks lack water resistance, and the evaporated molasses block also melted at elevated storage temperatures.

The most recent advance in supplement blocks is the poured chemical block, in which molasses is converted to water-resistance solids by additives. Large amounts of calcium oxide or magnesium oxide have been added to molasses and the resulting mixtures have been heated to form solids in the manner described in New Zealand Patent Specification No. 170,505. It has been found that solidification of molasses by this method is slow and requires substantial heating. The blocks which are formed are often too soft to limit their consumption and thus may require an additional appetite suppressant.

Entirely chemically gelled and hardened poured blocks and their manufacture are described in U.S. Pat. Nos. 4,027,043, 4,160,041 and 4,431,675. These blocks are prepared by the reaction of molasses, a soluble phosphate and the oxide or soluble salt of calcium and/or magnesium. No heating is required as the heat of reaction raises the temperature of the liquid mixture to between about 100° F. and 160° F. at the time it is poured into containers for solidification. Maximum hardness is attained by using both calcium and magnesium oxides.

Another method of manufacture of a poured block is shown in U.S. Pat. Nos. 4,171,385 and 4,171,386 in which the molasses is gelled with clay which is added with high shear agitation. Magnesium oxide is added to the liquid mixture and the hardness of the block can be increased by the addition of ferrous sulfate, as described in U.S. Pat. No. 4,265,916.

These products are intended for free choice or managed feeding. Unfortunately, in some free choice feeding situations, animals tend to overconsume the highly palatable molasses blocks, and appetite suppressants such as salt are often necessary ingredients. U.S. Pat. No. 4,431,675 discloses that the addition of magnesium oxide to a molasses block formed with calcium oxide and phosphoric acid increases its hardness sufficiently to limit its consumption without using appetite suppressants. The amount of magnesium oxide which must be used to achieve adequate hardness is usually much greater than the amount desired for nutrition, even though magnesium oxide is effective in prevention of grass tetany and acidosis and has been found to increase milk production of dairy cattle. In many applications none of these effects are needed, and in such applications the magnesium oxide is a costly ingredient without any nutritional benefit.

BRIEF STATEMENT OF THE INVENTION

This invention comprises a solid animal feed supplement which, preferably, is sufficiently hard and water resistant to limit its consumption when free choice feeding of animals. The solidification of commercial feed solutions of sugars, proteins, or mixtures thereof, for this purpose is achieved by the addition to molasses of calcium oxide or hydroxide and sulfuric or phosphoric acid, a protein meal and a filler, with optional amounts of magnesium oxide or hydroxide. The filler can be hulls, shells, or screenings of grains of grains and nuts.

The animal feed solution to which these ingredients are added comprises an aqueous solution of sugar or protein or mixtures thereof, preferably molasses. I have found that when a mixture of protein meal and filler are used in amounts from 10 to 40 weight percent of the supplement, and when the proportions of meal to filler are from 0.25 to 4, the amount of magnesium oxide required to achieve a hard solid can be limited to less than 3 weight percent. In some formulations the magnesium oxide can be entirely omitted, and a hard solid can still be produced.

DESCRIPTION OF THE PREFERRED EMBODIMENTS

The feed supplements which are used for practice of this invention in general have the composition set forth in the following table:

TABLE 1

| Ingredient | Proportions, Weight Percent | |
|---|---|---|
| | Broad | Preferred |
| Feed solution | 25–75 | 35–70 |
| Phosphate or Sulfate | 0–5 | 1–4 |
| Calcium* | 1–8 | 2–5 |
| Magnesium* | 0–3 | 0.5–2 |
| Total Water** | 10–35 | 15–28 |
| Non-protein nitrogen*** | 0–40 | 5–20 |
| Fat | 0–30 | 0–20 |
| Vitamins | 0–3 | 0.1–2 |
| Minerals | 0–40 | 0.1–2 |
| Protein Meal & Filler**** | 10–40 | 15–30 |

*Expressed as oxides.
**Total water includes water in the feed solution and any water added with other ingredients.
***Expressed as weight percent of equivalent protein.
****Weight Proportions of meal/filler from 0.25–4.0, Preferably 0.75 to 1.5

The content of minerals, phosphorus and calcium, as well as other ingredients such as drugs, vitamins, etc., can be varied as desired for specific applications. Examples of various minerals are manganese, iodine, zinc, copper, cobalt and iron compounds. In some specific applications, a high content of minerals is desirable, e.g., from 6 to 10 percent phosphorus, 5 t 8 percent calcium and from 0.1 to 2 percent mineral salts, which all can be added as finely divided powders. When the nutritional requirements exceed the amounts of calcium and phosphates required for solidification of the feed solution, the excess requirements can be furnished by the addition of water insoluble salts such as dicalcium and tricalcium phosphate. Examples of vitamins include Vitamin A, Vitamin D, and Vitamin E.

Examples of useful drugs are: growth promoting food additives or drugs such as monensin and sodium monensin, commercially available under the designation Rumensin from Eli Lilly Co.; chlorotetracyline and sulfamethiazine; and mixtures of chlorotetracyline and sulfamethiazine; etc. Other useful drugs include anti-bloat and antihelmintic agents as well as insect control agents. The aforementioned materials are used in effective concentrations for the desired result, e.g., drugs are used at concentrations from 0.5 to about 1.0 weight percent. The minerals are usually used in similar concentrations, but are often expressed in amounts from 3 to about 500 milligrams per pound and vitamins are frequently expressed from 10 to about 50,000 units per pound.

THE FEED SOLUTION

The animal feed supplement is prepared from a commercial aqueous feed solution. Generally, this will be a sugar solution which will contain from 40 to 85 percent solids with the balance being water. A variety of sugar solutions can be used; however, molasses is a preferred source. The feed solution should be present in the feed supplement at a concentration of from 25 to about 75, preferably from 35 to about 70, weight percent. Molasses is commercially available with a sugar content from about 65 to 85 Brix, and a consistency that varies from a thin to a thick syrup. The water content of these solutions is from 15 to about 35 weight percent. The molasses can be any sugar containing molasses such as cane or Blackstrap Molasses, beet molasses, converted molasses wood sugar molasses, hydrosyrup, citrus molasses and the like.

Another sugar solution that can be used is whey, a by-product of the dairy industry. The whey is a dilute solution of lactoalbumin, lactose, some fats, and the soluble inorganics from the parent milk. This whey solution is condensed and spray dried to a powder or is condensed to about 40 to 60 percent solids, the balance being water, and preserved. A typical analysis is as follows:

TABLE 2

| Composition of a Typical Dried Whey | |
| --- | --- |
| Protein | 12.0% |
| Fat | 0.7% |
| Lactose | 60.0% |
| Phosphorous | 0.79% |
| Calcium | 0.87% |
| Ash | 9.7% |

A third source of a useful sugar solution is the pulp and paper industry which produces large quantities of by-product lignin sulfonates from wood during the sulfite pulping process. After the separation of lignin, the acidity of the resultant solution is neutralized with an ammonium or alkali metal bisulfite compound or base to form the following organic salts:
Ammonium lignin sulfonate;
Sodium lignin sulfonate; and
Magnesium lignin sulfonate.

A typical analysis of a commercially available ammonium lignin sulfonate solution is as follows:

TABLE 3

| Typical Analysis of Ammonium Lignin Sulfonate | |
| --- | --- |
| Percent Solids | 50% |
| Specific gravity | 1.237 |
| pH, 10% solution | 3.5 |
| Sugars - expressed as glucose | 16.0% |
| Tannin content | 45.0% |
| Available ammonia | 3.0% |
| Sulfur | 6.0% |
| Ash | 1.0% |

The sugar solution is the energy ingredient of the supplement. Sources of other metabolizable organic values can be used to replace a portion of the sugar solutions. Examples of such other useful energy ingredients sources include condensed and dehydrated molasses solubles which are obtained from the fermentation of molasses to produce chemicals such as ethanol, citric acid, glutamic acid, etc. A material rich in metabolizable values, known as condensed molasses solubles, is obtained by evaporation of the residue from this fermentation. This material can also be dehydrated to dryness and the resultant dry solid is also a useful additive. Another very useful feed solution is a condensed or concentrated fermented corn extract, which is sometimes referred to as corn steep liquor or mazoferm. This material is obtained by concentrating the liquid remaining after steeping corn in an aqueous sulfur dioxide solution and allowing it to ferment. These materials can have from 40 to 100 percent solids and contain, on a dry veight basis, from 1 to 15 percent sugar and contain significant contents of protein, e.g., from 5 to about 25 percent.

Any of the aforementioned sugar solutions can be mixed with any other sugar solution, or used alone, to obtain a base solution of from 5 to 30 percent water which is used in the supplement at the aforementioned concentrations. Also, some or all of the sugar solution can be replaced with the aforementioned feed solutions (condensed molasses solubles or corn steep liquor), depending on the amount of natural protein which is desired in the final supplement.

THE PHOSPHATE OR SULFATE INGREDIENT

The phosphate or sulfate which can be employed as a solidifying component in the feed supplement can be phosphoric or sulfuric acid or any water soluble salt thereof, with the acids being preferred. Mixtures of the sulfate and phosphate can also be used in proportions of from 10 to 90 percent of either sulfate or phosphate. Examples of useful sulfates or phosphates include the alkali metal and ammonium salts, e.g., sodium sulfate, sodium phosphate, potassium sulfate, potassium phosphate, ammonium sulfate or ammonium phosphate. The ammonium salts are least preferred, as they tend to release ammonia after solidification. The most preferred ingredient is phosphoric acid which can be of any commercially available grade from 50 to 98 percent acid. When using sulfuric acid, the acid preferably is diluted to a concentration range of from 50 to about 75 weight percent to avoid excessive temperatures during its addition to the liquid ingredients. The sulfate or phosphate ingredient is employed in the sugar solution at a concentration up to 5 weight percent, preferably from 1.0 to about 4.0 weight percent, expressed as $SO_4$ or $P_2O_5$.

THE CALCIUM INGREDIENT

One of the solidifying components of the composition is calcium oxide or hydroxide. Commercially available lime (calcium oxide) is useful in finely subdivided form, typically 90 weight percent or more passing a 125 mesh screen. The more finely subdivided the lime, the faster that it will hydrate and participate in the solidification of the supplement. The lime can be slaked by mixing with water prior to addition to the sugar solution, or if desired, can be added directly to the aqueous sugar solution, depending on the process equipment and controls. The amount of the calcium oxide or hydroxide ingredient which is employed can be from 1.0 to about 8.0 weight percent, expressed as the oxide, and preferably can be from about 3.0 to about 5.0 weight percent based on the weight of the sugar solution.

THE MAGNESIUM OXIDE INGREDIENT

To those formulations which, in the absence of magnesium oxide produce a soft block, limited amounts of magnesium oxide can be added. When used, finely subdivided magnesium oxide is added in an amount from 0.5 to about 3.0 weight percent, preferably from 0.5 to about 2.0 weight percent. The magnesium oxide should be finely subdivided, at least 90 weight percent passing a 100 mesh screen, preferably, all passing a 225 mesh screen and, most preferably, all passing a 325 mesh screen. Preferably, the magnesium oxide has an activity of from 5 to about 65 seconds when measured in a standard activity test (citric acid test).

THE PROTEIN SOURCE

The feed supplement block also contains a nitrogen source for the animal's protein requirements. Generally the protein content of the feed supplement block will be from 1 to 35, preferably from 5 to 20, weight percent.

THE NON-PROTEIN NITROGEN

When the feed supplement is intended for consumption by ruminants, a non-protein nitrogen (NPN) compound such as urea, biuret or mono- or di-ammonium phosphates can be used to supplement the protein requirements. Although the NPN ingredient can be from 0 to 90 percent of the total protein of the supplement, it is preferred to limit the amount of this ingredient to a maximum content of 5 to 15 percent. A suitable non-protein nitrogen source is urea which can be added in an amount from 0.5 to about 5 weight percent, preferably from 1 to 4 weight percent, based on the supplement. Urea tends to soften the block, requiring an incrementally greater amount of magnesium oxide. The additional magnesium oxide required is from 20 to 30 percent of the amount of urea which is added. For this reason, it is preferred to use all natural protein.

In those applications where it is preferred to use all "natural" protein, a vegetable meal such as cottonseed meal, soy meal, rape seed meal, corn gluten meal, blood meal, feather meal, etc. can be used.

THE PROTEIN MEAL AND FILLER

The hardness of the block is enhanced, and the amount of magnesium oxide required for hardening the block is reduced, by including the combination of a protein meal and filler, in the block. For this purpose various protein meals can be used, such as: dried blood and meat meal from rendering plants, cottonseed meal, soy bean meal, rape seed meal, canola meal, sunflower seed meal, palm kernel oil meal, sesame oil meal, perilla oil meal, dehydrated alfalfa, dried and sterilized animal and poultry manure, fish meal, liquid or powdered egg, fish solubles, cell cream and rabbit pellets. Some or all of the protein can be "by-pass" protein, such as corn gluten meal, blood meal, feather meal, dried brewer's grains, distiller's dried grains, etc.

THE FILLER

The filler is a food by-product and can be bran, hulls, shells or screenings of grains, seeds, or nuts. These fillers are abundant and include: oat hulls, barley hulls, wheat hulls, almond hulls, almond shells, walnut shells, rye mill run, rye middlings, peanut skins, peanut hulls, rice hulls, rice bran, oat screenings, barley screenings, wheat screenings, wheat middlings, wheat shorts, etc.

Screenings are the foreign material produced during cleaning of grain and seeds, and include light and broken grains and agricultural seeds, weed seeds, hulls, chaff, joints, straw, mill dust, sand and dirt. The two designations of screenings which can be used are: grain screenings and mixed screenings. The grain screenings have at least 70 percent light and broken grains, wild buckwheat and wild oats. Mixed screenings contains less than 70 percent of grains.

The fillers have food value, and the following table summarizes the compositions of various available fillers, as well as meals which can be used with the filler:

| Filler | Crude Protein | Crude Fat | Crude Fiber |
|---|---|---|---|
| Almond Hulls | 4.4 | 4.0 | 14.0 |
| Barley Bran | 12.5 | 4.3 | 21.3 |
| Barley Middlings | 16.3 | 5.0 | 10.4 |
| Barley Mill Run | 11.7 | 2.8 | 15.7 |
| Bean Hulls, Velvet | 13.4 | 2.2 | 28.2 |
| Corn Gluten Meal | 48.0 | 2.4 | 4.2 |
| Corn, Broom | 10.6 | 4.8 | 5.8 |
| Cottonseed Hulls | 4.3 | 1.0 | 50.0 |
| Cottonseed Meal | 44.8 | 2.3 | 13.0 |
| Cottonseed, Whole | 24.9 | 21.1 | 18.0 |
| Feather Meal | 87.4 | 2.9 | 0.6 |
| Flax Hulls | 8.5 | 1.5 | 31.5 |
| Flax Seed Screenings | 17.3 | 10.9 | 14.2 |
| Grape Pomace, Dried | 12.7 | 7.6 | 33.0 |
| Hops, Spent, Dried | 24.8 | 5.1 | 24.3 |
| Oat Hulls | 3.8 | 1.5 | 32.2 |
| Oat Middlings | 17.4 | 6.4 | 3.2 |
| Oat Mill By-Product | 6.1 | 2.1 | 29.4 |
| Oat Mill Feed | 3.1 | 1.1 | 35.1 |
| Oat Shorts | 14.1 | 6.1 | 14.8 |
| Peanut Skins | 17.4 | 2.5 | 12.6 |
| Rice Bran | 13.0 | 13.0 | 13.0 |
| Rice By-Product | 6.7 | 5.6 | 33.0 |
| Rice Hulls | 3.1 | 0.9 | 44.5 |
| Rice Middlings | 15.6 | 6.8 | 9.6 |
| Rye Middlings | 18.4 | 3.8 | 5.8 |
| Rye Mill Run | 18.5 | 3.7 | 5.1 |
| Safflower Seeds | 19.5 | 32.0 | 31.0 |
| Screenings | 14.2 | 5.2 | 13.1 |
| Soybean Hulls | 12.4 | 2.8 | 36.1 |
| Soybean Meal | 49.6 | 1.4 | 7.0 |
| Soybean Mill Run | 13.6 | 1.4 | 40.7 |
| Wheat Bran | 18.0 | 5.0 | 11.0 |
| Wheat Chaff | 5.5 | 1.7 | 32.2 |
| Wheat Middlings | 19.9 | 5.7 | 8.9 |
| Wheat Mill Run | 17.0 | 4.8 | 9.0 |
| Wheat Shorts | 18.1 | 5.5 | 7.3 |
| Wheat Screenings | 13.6 | 4.3 | 10.2 |
| Buckwheat Hulls | 5.0 | 1.0 | 44.0 |
| Peanut Hulls | 6.0 | 1.0 | 60.0 |

The following examples illustrate practice of the invention and will serve to demonstrate results obtainable therewith.

EXAMPLE I

An animal feed supplement block is prepared in a laboratory experiment by mixing 70 weight parts water and 20 weight parts calcium oxide (lime). The mixture is stirred for 15 minutes and approximately 220 weight parts of 79.5 Brix cane molasses are added and the mixture is again stirred for 15 minutes.

Aqueous phosphoric acid (17 weight parts, 85% concentration) is added and the mixture is stirred for about 5 minutes. To this mixture is added a weighed amount of magnesium oxide powder (all passing 325 mesh screen). The mixture is stirred for about 5 minutes and then 15 weight parts salt, and the amounts of protein meal and screenings indicated in Table 4 are added. The mixture is stirred for 5 minutes and is then pourd into cardboard box containers where it begins to solidify to solids after about 30 minutes. After 72 hours, the hardnesses of the solids are determined on a standard hardness tester used to evaluate feed supplement blocks. The results are also reported in Table 4. Inspection of the solids reveal that they are integral and remain intact even after several months of storage. The blocks are hard and water resistant and can be provided to animals for free choice feeding without any risk of overconsumption.

The experiment is repeated in successive tests with the magnesium oxide added at 10, 8.5, 7.5, 6 and 5 weight parts. The hardness of the products are reported in the following table:

TABLE #4

Formulas & Sets
MgO = 1-2%
Amounts in Weight Parts

| Ingredients | #1 | #2 | #3 | #4 | #5 |
| --- | --- | --- | --- | --- | --- |
| Water | 70 | 70 | 70 | 70 | 70 |
| Lime | 20 | 20 | 20 | 20 | 20 |
| Molasses | 218 | 219 | 220 | 221 | 222 |
| Salt | 15 | 15 | 15 | 15 | 15 |
| Phosphoric acid | 17 | 17 | 17 | 17 | 17 |
| MgO | 10 | 8.5 | 7.5 | 6 | 5 |
| Corn gluten meal | 100 | 100 | 100 | 100 | 100 |
| Screenings | 50 | 50 | 50 | 50 | 50 |
| Total | 500 | 500 | 500 | 500 | 500 |
| 3 Day Hardness | 74 | 40 | 38 | 28 | 40 |

EXAMPLE II

The procedure of Example I is repeated in a series of nine experiments in which all the ingredients are used in consistent amounts, except for the protein meal and filler, which were varied in amounts and sources. In these experiments the magnesium oxide, lime, and phosphoric acid were used at 1.7%, 4.0% and 3.4%, respectively.

The products were inspected for hardness 24 hours following their preparation. The following table summarizes the formulations and hardness values of the products:

TABLE #5

Amounts in Weight Parts

| Ingredients | #1 | #2 | #3 | #4 | #5 | #6 | #7 | #8 | #9 |
| --- | --- | --- | --- | --- | --- | --- | --- | --- | --- |
| Lime | 20 | 20 | 20 | 20 | 20 | 20 | 20 | 20 | 20 |
| Water | 70 | 70 | 70 | 70 | 70 | 70 | 70 | 70 | 70 |
| Molasses | 220 | 220 | 220 | 220 | 220 | 220 | 220 | 220 | 220 |
| Salt | 15 | 15 | 15 | 15 | 15 | 15 | 15 | 15 | 15 |
| Phosphoric Acid | 17 | 17 | 17 | 17 | 17 | 17 | 17 | 17 | 17 |
| MgO | 8.5 | 8.5 | 8.5 | 8.5 | 8.5 | 8.5 | 8.5 | 8.5 | 8.5 |
| Corn gluten meal | 25 | — | — | — | — | — | 50 | — | — |
| Soy meal | — | 100 | — | — | — | — | — | — | — |
| Cottonseed meal | — | — | 100 | — | — | — | — | — | — |
| Blood meal | — | — | — | 100 | — | — | — | — | — |
| Screenings | 75 | 50 | 50 | 50 | 75 | 50 | 50 | 75 | — |
| Fat | — | — | — | — | 75 | — | — | — | — |
| Limestone | — | — | — | — | — | — | — | — | — |
| Dicalcium phosphate | — | — | — | — | — | — | — | — | — |
| Feather meal | — | — | — | — | — | 100 | 50 | 75 | — |
| Chicken Meal | — | — | — | — | — | — | — | — | — |
| 24 Hr Hardness | 75 | 80 | 70 | 25 | 4 | 50 | 60 | 65 | 28 |

Samples 4, 5 and 9 were too soft for free choice feeding, thereby evidencing that when a hard block for free-choice feeding is desired: (1) bloodmeal is only marginally useful as a protein meal; (2) it is necessary to include a protein meal; and (3) it is necessary to include both protein meal and filler.

EXAMPLE III

Example I is again repeated in a series of five experiments except no salt is added, and the mangesium oxide is used at 1.0 weight percent in all experiments. Oat screenings are used as the filler, and the protein meal is selected from various sources. In the last two experiments, the amounts of protein meal and filler are reduced.

The solids are measured for hardness 24 hours after preparation. The following table summarizes the formulations and hardness values of the solid products:

TABLE #6

| Ingredients | #1 | #2 | #3 | #4 | #5 |
| --- | --- | --- | --- | --- | --- |
| Lime | 20 | 20 | 20 | 20 | 20 |
| Water | 70 | 70 | 70 | 70 | 70 |
| Molasses | 220 | 220 | 220 | 220 | 220 |
| Salt | 15 | 15 | 15 | 15 | 15 |
| Phosphoric Acid | 17 | 17 | 17 | 17 | 17 |
| MgO | 5 | 5 | 5 | 5 | 5 |
| Corn Gluten meal | 37 | — | — | — | — |
| Feather meal | 37 | — | — | — | — |
| Soy meal | — | 75 | — | 50 | 25 |
| Cottonseed | — | — | 75 | — | — |
| Screenings | 75 | 75 | 75 | 50 | 25 |
| 24 Hr. Hardness | 80 | 80 | 70 | 70 | 25 |

The data evidence that all the protein meals functioned with the oat screenings to produce blocks of acceptable hardness. The results of Sample 5 evidence that the screenings and protein meal, together, should be greater than 10 weight percent of the formulation to obtain adequate hardness for free choice feeding.

EXAMPLE IV

Example I is repeated with a mixture of corn gluten and oat screenings, and the magnesium oxide is omitted entirely from the formulation.

The hardness of the solid product was measured after 24 and 60 hours. The formulation and hardness values are summarized in the following table:

TABLE #7

| Ingredients | |
|---|---|
| Lime | 20 |
| Water | 70 |
| Molasses | 210 |
| Phosphoric Acid | 17 |
| MgO | 0 |
| Salt | 15 |
| Feather meal | 43 |
| Corn gluten meal | 43 |
| Screenings | 70 |
| Hardness @ 24 Hours | 25 |
| Hardness @ 5 Days | 60 |

The results indicate that the magnesium oxide can be omitted entirely provided that the products are stored for at least 2½ days before feeding.

EXAMPLE V

A series of 20 experiments were performed following the general procedure of Example I except that the sample sizes were approximately twice those of Example I. Each formulation was prepared without any magnesium oxide, then divided into two equal parts and magnesium oxide was added to one part of each sample at a concentration of 2 weight percent. Ten different fillers were used in the experiments. These fillers were samples of commercially available feed mill by-products.

The fillers were:
(1) barley screenings
(2) a mixture of walnut shells and meats, beans and barley screenings;
(3) a mixture of ground barley, ground corn, ground grain screenings, rice mill by-product, grape pomace and rasin pomee;
(4) rice bran
(5) rice screenings
(6) wheat and corn screenings
(7) ground almond hulls
(8) mixed oat, wheat, rice and barley screenings; and
(9) corn screenings The solid products were tested for hardness after 24 and 48 hours. The following table summarizes the formulations and hardness of the solid products:

TABLE 8

| Ingredient | #1 | #2 | #3 | #4 | #5 | #6 | #7 | #8 | #9 | #10 |
|---|---|---|---|---|---|---|---|---|---|---|
| Water | 180 | 180 | 180 | 180 | 180 | 180 | 180 | 180 | 180 | 180 |
| Lime | 50 | 50 | 50 | 50 | 50 | 50 | 50 | 50 | 50 | 50 |
| Molasses | 390 | 390 | 390 | 390 | 390 | 390 | 390 | 390 | 390 | 390 |
| Phosphoric Acid | 30 | 30 | 30 | 30 | 30 | 30 | 30 | 30 | 30 | 30 |
| MgO | — | 20 | — | 20 | — | 20 | — | 20 | — | 20 |
| Feather meal | 88 | 88 | 88 | 88 | 88 | 88 | 88 | 88 | 88 | 88 |
| Corn Gluten | 88 | 88 | 88 | 88 | 88 | 88 | 88 | 88 | 88 | 88 |
| Barley Screen. | 150 | 150 | — | — | — | — | — | — | — | — |
| PMBP | — | — | 150 | 150 | — | — | — | — | — | — |
| #38 | — | — | — | — | 150 | 150 | — | — | — | — |
| #30 | — | — | — | — | — | — | 150 | 150 | — | — |
| Rice Bran | — | — | — | — | — | — | — | — | 150 | 150 |
| Rice Screen. | — | — | — | — | — | — | — | — | — | — |
| Wheat & Corn Sc. | — | — | — | — | — | — | — | — | — | — |
| Gnd Almonds | — | — | — | — | — | — | — | — | — | — |
| Mixed Screen. | — | — | — | — | — | — | — | — | — | — |
| Corn Screen. | — | — | — | — | — | — | — | — | — | — |
| Extra Water | 25 | 25 | 55 | 55 | 50 | 50 | 20 | 20 | 65 | 65 |
| Total Wt. | 1001 | 1021 | 1031 | 1051 | 1026 | 1046 | 1000 | 1020 | 1041 | 1061 |
| Hardness: | | | | | | | | | | |
| 24 hours | 10 | 45 | 18 | 40 | 0 | 20 | 2 | 45 | 15 | 50 |
| 48 hours | 36 | 73 | 36 | 68 | 38 | 58 | 37 | 68 | 24 | 68 |
| Ingredient | #11 | #12 | #13 | #14 | #15 | #16 | #17 | #18 | #19 | #20 |
| Water | 180 | 180 | 180 | 180 | 180 | 180 | 180 | 180 | 180 | 180 |
| Lime | 50 | 50 | 50 | 50 | 50 | 50 | 50 | 50 | 50 | 50 |
| Molasses | 390 | 390 | 390 | 390 | 390 | 390 | 390 | 390 | 390 | 390 |
| Phosphoric Acid | 30 | 30 | 30 | 30 | 30 | 30 | 30 | 30 | 30 | 30 |
| MgO | — | 20 | — | 20 | — | 20 | — | 20 | — | 20 |
| Feather meal | 88 | 88 | 88 | 88 | 88 | 88 | 88 | 88 | 88 | 88 |
| Corn Gluten | 88 | 88 | 88 | 88 | 88 | 88 | 88 | 88 | 88 | 88 |
| Barley Screen. | — | — | — | — | — | — | — | — | — | — |
| PMBP | — | — | — | — | — | — | — | — | — | — |
| #38 | — | — | — | — | — | — | — | — | — | — |
| #30 | — | — | — | — | — | — | — | — | — | — |
| Rice Bran | — | — | — | — | — | — | — | — | — | — |
| Rice Screen. | 150 | 150 | — | — | — | — | — | — | — | — |
| Wheat & Corn Sc. | — | — | 150 | 150 | — | — | — | — | — | — |
| Gnd Almonds | — | — | — | — | 150 | 150 | — | — | — | — |
| Mixed Screen. | — | — | — | — | — | — | 150 | 150 | — | — |
| Corn Screen. | — | — | — | — | — | — | — | — | 150 | 150 |
| Extra Water | 20 | 20 | 20 | 20 | 20 | 20 | 30 | 30 | 30 | 30 |
| Total Wt. | 1000 | 1020 | 1000 | 1020 | 1000 | 1061 | 1010 | 1030 | 1010 | 1030 |
| Hardness: | | | | | | | | | | |
| 24 hours | 0 | 20 | 10 | 60 | 2 | 42 | 10 | 50 | 5 | 35 |
| 48 hours | 18 | 80 | 40 | 70 | 24 | 63 | 20 | 73 | 27 | 53 |

The data indicate that all fillers were effective with magnesium oxide at 2 weight percent to produce a sufficiently hard block for free-choice eeding. The data also indicate that the magnesium oxide can be eliminated from some of the formulations while still preparing an acceptably hard product. Those formulations were Samples 1, 3, 5, 7 and 13 with fillers 1, 2, 3, 4 and 7 previously identified.

I claim:

1. In a method for the preparation of an animal feed supplement wherein an aqueous solution of sugar, protein, or mixtures thereof is solidified by the addition to said solution of calcium oxide or hydroxide in an amount from 2 to 5 percent as the oxide, and phosphoric acid or a soluble phosphate in an amount from 1 to 4 percent as phosphate, and the esulting mixture is permitted to solidify, the improvement comprising:
   (a) incorporating in said mixture prior to its solidification:
      (1) a protein meal in an amount from 2 to 20 weight percent; and
      (2) a solid filler selected from the group consisting of bran, hulls, shells and screenings of grains and nuts in an amount from 16 to about 20 weight percent; and
   (b) controlling the amounts of said protein meal and filler added in steps (a)(1) and (a)(2) to a combined total from 10 to 40 weight percent and adjusting the weight proportions of said meal to filler from 0.25 to 4, to produce a solid having a 24-hour hardness from 35 to 60.

2. The method of claim 1 including the additional step of adding magnesium oxide to said solution in an amount from 0.5 to 2.0 weight percent, as required to obtain said 24-hour hardness of said solid.

3. The method of claim 1 including the additional steps of adding: urea to said solution in an amount from 1 to about 10 weight percent, and magnesium oxide in an amount up to 3 weight percent, as required to obtain said 24-hour hardnes of said block.

4. The method of claim 1 including the additional step of adding an edible fat to said mixture in an amount from 1 to about 20 weight percent.

5. The method of claim 1 wherein said filler is grain screenings.

6. The method of claim 1 wherein said filler is oat hulls.

7. The method of claim 1 wherein said filler is barley screenings.

8. The method of claim 1 wherein said filler is ground nut shells.

9. The method of claim 1 wherein said filler is ground almond hulls.

10. The method of claim 1 wherein said filler is rice bran.

11. The method of claim 1 wherein said protein meal includes chicken meal.

12. The method of claim 1 wherein said protein meal includes corn gluten meal.

13. The method of claim 1 wherein said protein meal is cottonseed meal.

14. The method of claim 1 wherein the combined total of protein meal and filler is 25 to 35 weight percent.

15. The method of claim 1 wherein the weight proportions of protein meal to filler are from 0.75 to 1.5.

16. An animal feed supplement solid having a 24-hour hardness from 35 to 60 which consists essentially of:
   (a) a sugar solution having a solids content from 40 to 85 percent in an amount from 25 to 75 weight pecent of said supplement;
   (b) calcium oxide in an amount from 2 to about 5 weight percent of said supplement;
   (c) water in an amount from 15 to about 28 weight percent of said supplement;
   (d) a protein meal in an amount from 2 to 20 weight percent; and
   (e) a solid filler selected from the group consisting of bran, hulls, shells and screenings of grains and nuts in an amount from 1 to about 20 weight prcent; with the amounts of said protein meal and filler limited to a combined total from 10 to 40 weight percent, and with the weight proportions of said meal to filler being from 0.25 to 4, to produce said solid having a 24-hour hardness from 35 to 60.

17. The animal feed supplement of claim 16 including an acid selected from the group consising of phosphoric and sulfuric acids added to said supplement in an amount up to five weight percent.

18. The animal feed supplement of claim 17 wherein said acid is phosphoric acid.

19. The animal feed supplement of claim 18 wherein said phosphoric acid is added in an amount from 1 to 4 weight percent of said supplement.

20. The animal feed supplement of claim 16 including magnesium oxide added in an amount up to about 3 weight percent of said supplement.

21. The animal feed supplement of claim 20 wherein said magnesium oxide is added in an amount from 0.5 to 2 weight percent of said supplement.

22. The animal feed supplement of claim 16 wherein fat is added in an amount up to about 30 weight percent to said supplement.

23. The animal feed supplement of claim 22 wherein said fat is added in an amount up to about 20 weight percent of said supplement.

24. The animal feed supplement of claim 16 wherein said filler is grain screenings.

25. The animal feed supplement of claim 16 wherein said filler is oat hulls.

26. The animal feed supplement of claim 16 wherein said filler is barley screenings.

27. The animal feed supplement of claim 16 wherein said filler is ground nut shells.

28. The animal feed supplement of claim 16 wherein said filler is ground almond hulls.

29. The animal feed supplement of claim 16 wherein said filler is rice bran.

30. The animal feed supplement of claim 16 wherein said protein meal includes chicken meal.

31. The animal feed supplement of claim 16 wherein said protein meal includes corn gluten meal.

32. The animal feed supplement of claim 16 wherein said protein meal is cottonseed meal.

33. The animal feed supplement of claim 16 wherein the combined total of protein meal and filler is 25 to 35 weight percent.

34. The animal feed supplement of claim 16 wherein the proportions of protein meal to filler are from 0.75 to 1.5.

* * * * *